(12) United States Patent
Schmidt et al.

(10) Patent No.: US 8,028,950 B2
(45) Date of Patent: Oct. 4, 2011

(54) COUPLING SYSTEM BETWEEN PRE-TENSIONING WHEEL AND SEAT BELT RETAINER SPOOL

(75) Inventors: Martin Schmidt, Elmshorn (DE); Stefan Suhr, Elmshorn (DE); Thomas Schneider, Simonsberg (DE)

(73) Assignee: Autoliv Development AB, Vargarda (SE)

( * ) Notice: Subject to any disclaimer, the term of this patent is extended or adjusted under 35 U.S.C. 154(b) by 655 days.

(21) Appl. No.: 11/596,643

(22) PCT Filed: Apr. 22, 2005

(86) PCT No.: PCT/EP2005/004363
§ 371 (c)(1),
(2), (4) Date: Oct. 9, 2007

(87) PCT Pub. No.: WO2005/110823
PCT Pub. Date: Nov. 24, 2005

(65) Prior Publication Data
US 2008/0042001 A1    Feb. 21, 2008

(30) Foreign Application Priority Data
May 14, 2004   (DE) .......................... 10 2004 024 008

(51) Int. Cl.
*B60R 22/46* (2006.01)
(52) U.S. Cl. ....................................... 242/374; 242/394
(58) Field of Classification Search .................. 242/374, 242/390.5, 390.6, 390.8, 390.9, 394; 280/806, 280/807; 297/475–478
See application file for complete search history.

(56) References Cited

U.S. PATENT DOCUMENTS

| 4,455,000 | A | | 6/1984 | Nilsson |
| 4,664,334 | A | * | 5/1987 | Asagiri et al. ................ 242/372 |
| 4,741,556 | A | * | 5/1988 | Nagashima .................... 280/807 |
| 5,526,996 | A | * | 6/1996 | Ebner et al. ................... 242/374 |
| 5,749,536 | A | * | 5/1998 | Specht et al. ................. 242/374 |
| 2002/0005447 | A1 | * | 1/2002 | Nagata et al. ................. 242/374 |
| 2003/0052209 | A1 | | 3/2003 | Honl et al. |
| 2005/0178870 | A1 | | 8/2005 | Loffler et al. |

FOREIGN PATENT DOCUMENTS
WO    WO/03082640 A1    10/2003
* cited by examiner

*Primary Examiner* — Michael Mansen
*Assistant Examiner* — Scott Haugland
(74) *Attorney, Agent, or Firm* — Brinks Hofer Gilson & Lione

(57) ABSTRACT

A combination of belt retractor and belt pre-tensioner in which the pre-tensioning device is coupled to the belt shaft by means of the vehicle-sensitive or belt strap sensitive locking system of the belt retractor, is characterized in that a lever (16) entrained by the drive wheel (10) on its rotation in the pre-tensioning direction is mounted pivotally on the housing and on its pivoting movement effected by the rotation of the drive wheel (10) its free end (18) comes into engagement with the control disc (12) and in so doing, over part of its pivoting movement, drives the control disc (12) for its relative rotation relatively to the belt shaft and after the lever (16) has passed through its pivoting path serving to drive the control disc (12) it is released from the control disc (12) and the drive wheel (10).

3 Claims, 1 Drawing Sheet

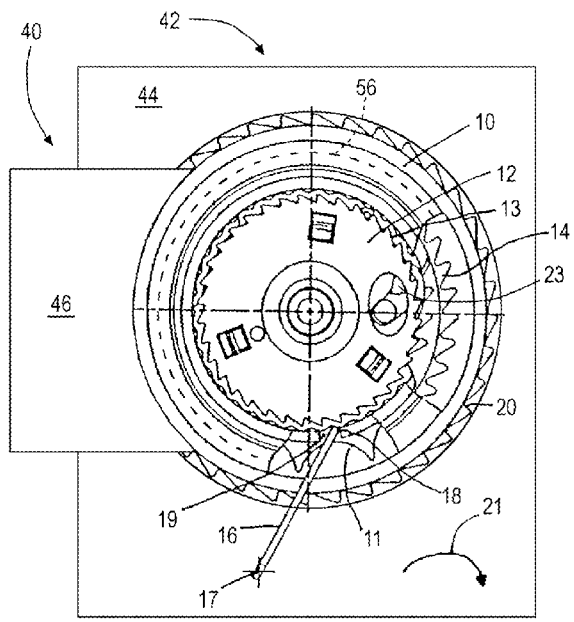
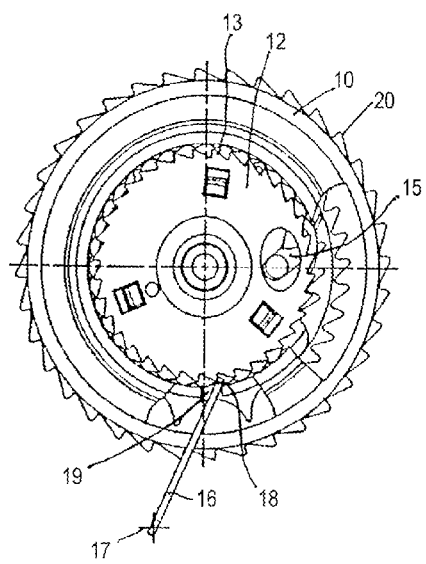
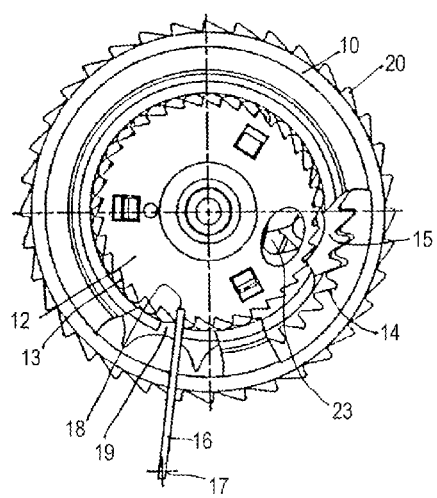
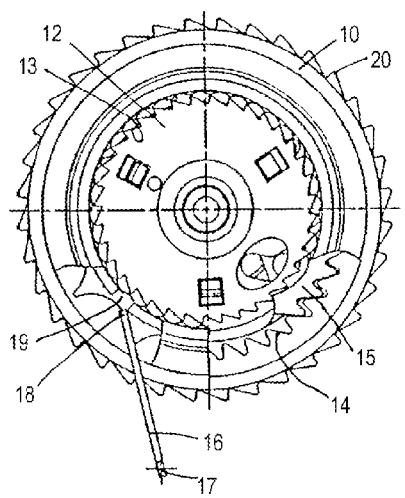
Fig. 1
Fig. 2
Fig. 3
Fig. 4

COUPLING SYSTEM BETWEEN PRE-TENSIONING WHEEL AND SEAT BELT RETAINER SPOOL

CROSS REFERENCE TO RELATED APPLICATIONS

This application claims priority to German patent application number 10 2004 024 008.6, filed May 14, 2004 and PCT/EP2005/004363, filed Apr. 22, 2005.

BACKGROUND AND SUMMARY OF THE INVENTION

This invention is adapted for use with a combination of belt retractor and belt tensioner with a housing, with a belt shaft locking device having at least one locking device which can be actuated, with vehicle sensitivity and/or belt strap sensitivity, into a set of locking teeth on the housing side, and with a pre-tensioning device which acts on the belt shaft and comprises a drive wheel which can be connected to the belt shaft via the locking device in power-transmitting relationship. In this type of retractor, the drive wheel acts on a control disc as part of the vehicle sensitive and/or belt strap sensitive control system for the locking device and, as a result of the relative rotation of the control disc relatively to the belt shaft as introduced by way of the drive wheel the locking device is actuated into the power-transmitting engagement with the drive wheel.

A belt retractor combination with the aforementioned characteristics is described as a so-called power roto-pre-tensioner in WO03/082640 A1. A particular characteristic of this known belt retractor and belt pre-tensioner combination consists in the fact that no coupling is provided for coupling the drive wheel to the belt shaft and that instead of this the locking device which is needed for the self-locking belt retractor function or the correspondingly arranged locking means is used in the form of a radially displaceable blocking latch for power-transfer connection of the drive wheel with the belt shaft during the pre-tensioning operation. At the same time, the drive wheel is coupled, following triggering of the pre-tensioning device, to the housing of the belt retractor-belt tensioner combination by means of a releasable blocking latch and therefore forms, for the belt retractor function, a part of the housing for restraining the blocking forces from the belt shaft.

As the movement of the blocking latch within the framework of the self-blocking belt retractor function is carried out by an associated control disc and its vehicle-sensitive or belt-sensitive relative rotation to the belt shaft, in the known belt-retractor-belt tensioner combination, a separate trigger element is provided, which is connected with the drive wheel by means of an interference fit and which can be coupled with the control disc via inertia-controlled coupling members. If, following triggering of the pre-tensioning device, the drive wheel starts to turn in the direction of retracting the belt webbing, the trigger element which is also turning is, because of the mass inertia of its associated coupling members, coupled with the control disc and drives with its rotary direction. The relative rotation of the control disc in relation to the belt shaft which is instigated by these means leads to displacement of the blocking latch into force-transferring engagement with an inner toothing formed on the drive wheel. This means that the belt shaft is coupled to the rotating drive wheel in a power-transferring fashion.

The disadvantage is associated with the known belt retractor-belt pre-tensioner combination in that the arrangement of the additional trigger element with its allocated mass-controlled coupling members presents additional work and costs in manufacturing and mounting of these additional components, whereby such an additional coupling lengthens the response path of the pre-tensioning device for the belt shaft and can also present a function-related weak point. In a belt retractor-belt pre-tensioner combination with the above described generic characteristics, this invention simplifies the triggering of the coupling of the drive wheel to the belt shaft at the start of the rotation of the drive wheel.

The solution of this task, including advantageous forms and further developments of the invention, results from the content of the present invention.

The basic idea of the present invention is that a lever is provided which is driven by the drive wheel when it turns in the pre-tensioning direction is located so as to be capable of swiveling relative to the housing, whose free end engages with the control disc by means of its swivel movement which occurs by means of rotation of the drive wheel and thereby drives the control disc to a relative rotation in relation to the belt shaft over a part of its swivel path. The lever, after completing a swivel path serving to drive the control disc, becomes free from the control disc and the drive wheel. The invention entails the advantage that with the swivel lever, only one additional component has to be provided, which in addition is affected by the drive wheel with a forced control and by these means provides the necessary rotary movement of the control disc. A considerable simplification of the structure of the belt retractor—belt pre-tensioner combination is associated with this, and also an improvement as regards functional reliability. As the lever at the end of its function is taken out of engagement with the control disc and the drive wheel and remains in this position, the further function of the belt retractor-belt pre-tensioner combination can no longer be affected by the lever.

According to an embodiment of the invention it is provided that the pivot bearing of the lever is arranged outside the drive wheel on the housing and the lever of the drive wheel penetrates through a gap formed in its circumference. During the swivel path of the lever the drive of the control disc is engaged with its free end with an outer teeth formed on the control disc. It can also be provided that the pivot bearing of the lever is arranged in such a way that the lever, after completing its engagement movement with the control disc is pushed out of the gap in the drive wheel through the further rotation of the drive wheel.

BRIEF DESCRIPTION OF THE DRAWINGS

In the drawing, an embodiment of the invention is shown which is described below. The drawing is as follows:

FIG. 1 is an isolated illustration of the drive wheel with control disc lying behind it and lever of a belt retractor-belt tensioner combination of the generic type in a schematic side view before triggering of the pre-tensioning device, FIG. 2 is similar to FIG. 1 but showing the components of rotation of the drive wheel and resulting first contact of the lever with the control wheel, FIG. 3 is similar to FIG. 1 but showing the components during driving of the control disc because of the swivel movement of the lever, FIG. 4 is similar to FIG. 1 but showing the components following the function-dependent movement of the lever.

DETAILED DESCRIPTION OF THE INVENTION

The belt retractor-belt pre-tensioner combination useful with the features of this invention is described as regards its overall structure and function in WO03/082640 A1 having corresponding U.S. Patent Application No. 2005/0178870, so that reference is made to publication of the aforementioned applications which are hereby incorporated by reference. Instead of the driver part which is fixed to the drive wheel by means of associated interference fit elements, which, via the mass inertia coupling latches and their engagement into the inner toothing formed onto an inertia mass, functionally corresponding to a control disc, triggers and effects the relative movement of the inertia mass and control disc in relation to the belt shaft, a lever 16 described below is provided in the present invention, offering a simplified construction.

In a simplified illustration, a pre-tensioning device 46 of a pre-tensioner 40 includes a drive wheel 10 as shown in FIGS. 1 to 4, which, on the outer circumference of the drive wheel 10, is provided with sprocket teeth 11 for acceptance of mass spheres (not shown) serving as a drive and accelerated by a pyrotechnic drive charge. This arrangement is a known pre-tensioner system described as a "roto-pre-tensioner". In another plane, drive wheel 10 extending through housing opening 52 (schematically shown for illustrative purposes only and as shown in FIG. 1 of WO03/082640 A1 and corresponding U.S. Patent Application No. 2005/0178870) has additionally exhibits outer teeth 20 for its fixing on the housing 44 (schematically shown for illustrative purposes only and as discussed in WO03/082640 A1 and corresponding U.S. Patent Application No. 2005/0178870) of the belt retractor 42 (schematically shown for illustrative purposes only and as discussed in WO03/082640 A1 and corresponding U.S. Patent Application No. 2005/0178870) and the pre-tensioner 40 combination, as well as inner teeth 14 for engagement of at least one blocking latch 15 mounted on or coupled to (via profile head 23 and/or torsion bar 54 schematically shown for illustrative purposes only and as discussed in WO03/082640 A1 and corresponding U.S. Patent Application No. 2005/0178870) the belt shaft 56 (schematically shown for illustrative purposes only and as discussed in WO03/082640 A1 and corresponding U.S. Patent Application No. 2005/0178870) of the belt retractor-belt pre-tensioner combination so as to be able to swivel out. Blocking latch 15 is displaced with a relative rotation of a control disc 12 provided with an outer teeth 13 in relation to the belt shaft into its engagement position as can be seen in FIGS. 3 and 4 with the inner teeth 14 of drive wheel 10. This design and construction, including the corresponding function of the components referred to, is described in detail in WO03/082640 A1.

On the housing, not further illustrated here, a lever 16 is located so as to be capable of swiveling about a pivot bearing 17 formed on its end so as to be fixed to the housing, which penetrates drive wheel 10 in a gap 19 formed on its outer circumference and lies in its rest position shown in FIG. 1 with its free end 18 tangential to the outer circumference of control disc 12, however, without in the rest position shown in FIG. 1 before triggering of the pre-tensioning device, hindering the rotating movement of control disc 12 during the normal function of the belt retractor.

If now, following triggering of the pre-tensioning device, drive wheel 10 is accelerated in its rotational pre-tensioning direction which in the embodiment as shown is in the clockwise direction corresponding to arrow 21. During such movement drive wheel 10 necessarily drives lever 16 lying in its gap 19, and starts it into a swivel movement around pivot bearing 17. In this process, lever 16 comes with its free end 18 into contact with outer teeth 13 of control disc 12 (FIG. 2) and, during its further swivel movement caused by the further rotation of drive wheel 10, drives control disc 12 and starts it turning (FIG. 3), so that the relative rotation of control disc 12 in relation to the belt shaft which is needed to engage blocking latch 15 into the inner toothing 14 of drive wheel 10 is effected. During further rotation of drive wheel 10, lever 16 with is free end 18 is pushed out of gap 19 and therefore becomes free of drive wheel 10 and of control disc 12; as lever 16 remains in this position, lever 16 can no longer have a negative effect on the further function of the belt retractor-belt tensioner combination, regardless of further rotational direction of the drive wheel and control disc.

The relatively short swivel path of lever 16 which is implemented in this solution as drive path for control disc 12 is sufficient, because a relatively small relative rotation of control disc 12 in relation to the belt shaft is sufficient, in order to displace blocking latch 15 into its engagement position with inner toothing 14 of drive wheel 10.

While the above-description constitutes the preferred embodiment of the present invention, it will be appreciated that the invention is susceptible to modification, variation and change without departing from the proper scope and fair meaning of the accompanying claims.

The invention claimed is:

1. A combination of belt retractor and belt pre-tensioner comprising a housing, with a belt shaft locking device coupled with a belt shaft and which can be actuated into engagement with a set of locking teeth on a drive wheel, a pre-tensioning device which acts on the belt shaft and having the drive wheel which can be connected to the belt shaft via the locking device in power-transmitting relationship, wherein the drive wheel acts on a control disc as part of the locking device and, as a result of the relative rotation of the control disc relatively to the belt shaft upon rotation of the drive wheel the locking device is actuated into the power-transmitting engagement with the drive wheel, a lever engaged by the drive wheel on its rotation in a pre-tensioning direction mounted pivotally on the housing on a pivot, the pivot movement of the lever effected by the rotation of the drive wheel wherein the lever free end comes into engagement with the control disc and in so doing, over part of the pivot movement, drives the control disc for relative rotation with respect to the belt shaft and after the lever has passed through the part of the pivoting movement serving to drive the control disc the lever is released from the control disc and the drive wheel.

2. A combination of belt retractor and belt tensioner according to claim 1, wherein the pivot for the lever is disposed outside the drive wheel on the housing and the lever extends through the drive wheel in a gap formed on the periphery of the drive wheel and during the pivoting movement serving to drive the control disc the lever free end engages an outer set of teeth formed on the control disc.

3. A combination of belt retractor and belt tensioner according to claim 1, wherein the pivot of the lever is so disposed that on completion of its engagement movement with the control disc the lever is displaced from the gap of the drive wheel by the further rotation of the drive wheel.

* * * * *